US006742870B2

(12) United States Patent
Kroon

(10) Patent No.: US 6,742,870 B2
(45) Date of Patent: Jun. 1, 2004

(54) SELECTIVE ENHANCEMENT OF BLACK

(75) Inventor: Stephen M. Kroon, Sherwood, OR (US)

(73) Assignee: Xerox Corporation, Stamford, CT (US)

( * ) Notice: Subject to any disclaimer, the term of this patent is extended or adjusted under 35 U.S.C. 154(b) by 57 days.

(21) Appl. No.: 10/280,214

(22) Filed: Oct. 25, 2002

(65) Prior Publication Data

US 2004/0080572 A1 Apr. 29, 2004

(51) Int. Cl.[7] .............................. B41J 2/21; G03G 15/01
(52) U.S. Cl. ................... 347/43; 347/15; 399/40
(58) Field of Search ..................... 347/15, 43, 115, 347/151; 399/39, 40, 54

(56) References Cited

U.S. PATENT DOCUMENTS 5,900,891 A * 5/1999 Shimoda ...................... 347/43
6,186,615 B1 * 2/2001 Sato et al. .................... 347/43

* cited by examiner

Primary Examiner—Lamson Nguyen
(74) Attorney, Agent, or Firm—Manuel Quiogue

(57) ABSTRACT

A printing technique wherein pixel locations that are requested to be marked with only black are identified, black is applied to the identified pixel locations, and non-black color is applied to a subset of the identified pixel locations that correspond to on-pixels of a reference pattern of non-black color pixels having an on-pixel population of at least 20 percent and a toner transfer efficiency of less than about 20 percent.

41 Claims, 2 Drawing Sheets

SELECTIVE ENHANCEMENT OF BLACK

BACKGROUND OF THE DISCLOSURE

The subject disclosure is directed generally to raster printing enhanced black, and more particularly to selectively printing enhanced black.

Raster printing systems accomplish printing by forming small marks or dots at selected pixel locations, and are commonly implemented as electrophotographic printers and ink jet printers. In raster printing systems, it is known to print one or more non-black color dots (e.g., cyan, magenta or yellow) with black dots, for example to improve black density and uniformity in dark gray regions. However, since color-to-color registration can be less than ideal, it may be preferable not to add non-black color to black near edges where color fringes will tend to show if mis-registration is present. This can be particularly important in light half-toned grays where even a slight mis-registration could induce a noticeable hue shift.

While there are known techniques directed to reducing color fringes, they can be complex and computationally expensive.

DETAILED DESCRIPTION OF THE DISCLOSURE

Figure 1:
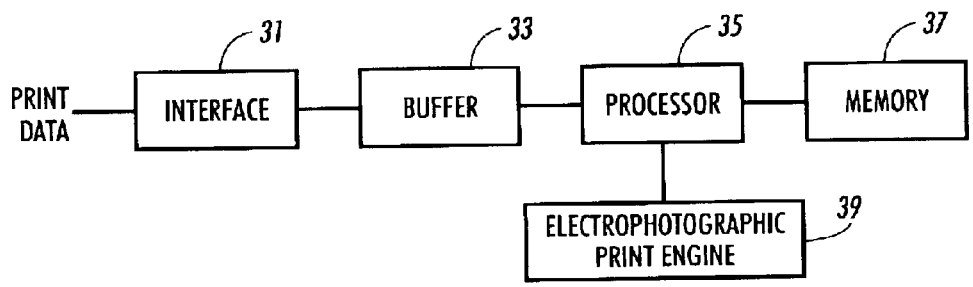
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. An electrophotographic print engine 39 prints an image pursuant to the bit mapped raster data generated by the processor 35.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

By way of illustrative example, black can be first printed to the print output medium followed by the non-black primaries. This can be accomplished for example by first depositing black on the output print medium, or by depositing black last on a transfer surface that accumulates all primary color layers, such that black becomes the first layer on the print output medium.

Figure 2:
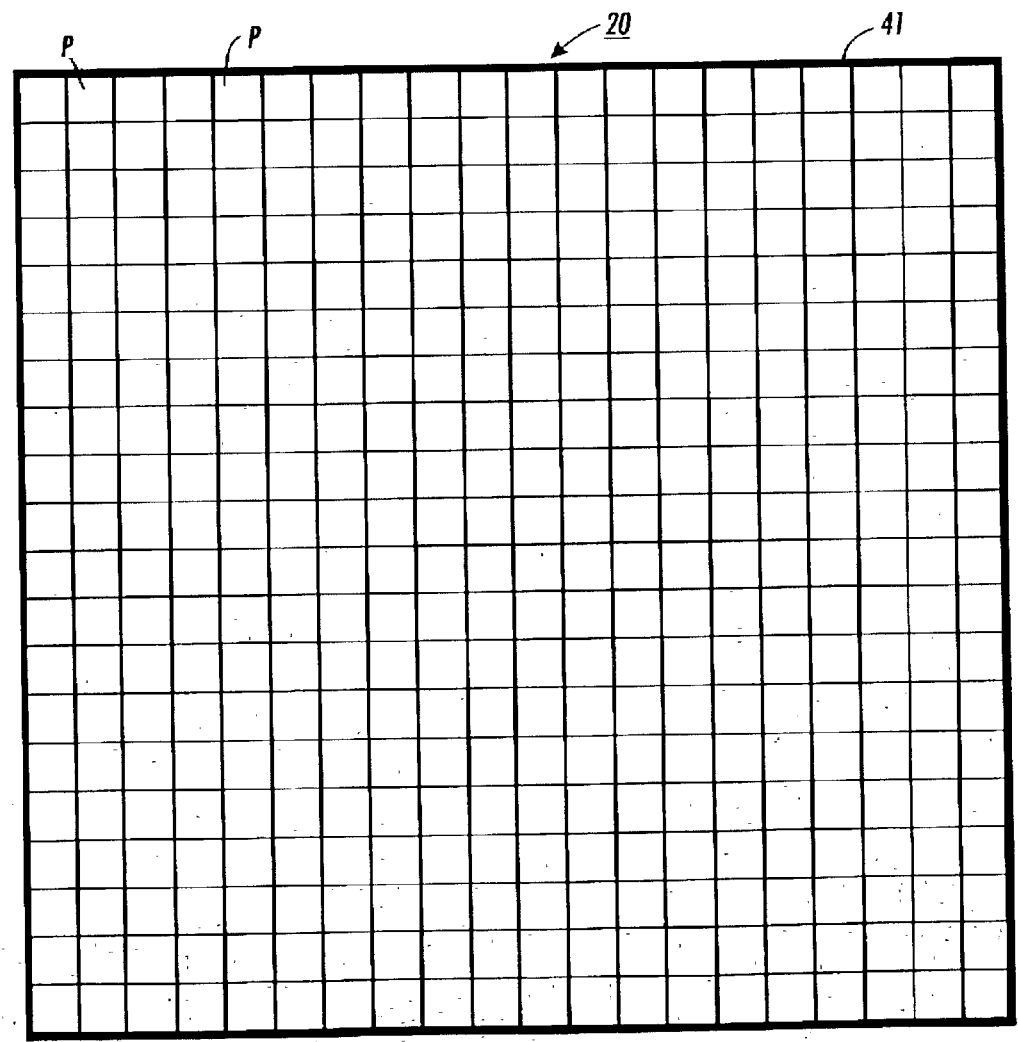
FIG. 2 is a schematic illustration of an embodiment of a pixel array.

FIG. 2 is a schematic illustration of an embodiment of an array 20 of pixel locations P that can be used to define the locations on an output print medium 41 that can be marked or printed. A marking of a particular color (e.g., cyan, magenta, yellow or black) that is printed or deposited at a pixel location can be conveniently called a dot. Black refers to a marking made with a black color, as distinguished from process black or composite black which refer to a marking formed of a cyan marking, a yellow marking and a magenta marking that are closely positioned or superimposed, for example.

Each pixel location P can, for example, be marked or printed with (a) one or more non-black color dots (e.g., cyan magenta or yellow), (b) a black dot by itself, or (c) a black dot and at least one non-black color dot. For ease of reference, pixel locations that are to be printed with only black (i.e., without any other color) can be called black pixel locations or true black pixel locations. The printing of a non-black color dot with a black dot at a black pixel location (i.e., a location originally requested to be printed with black only) can provide for an enhanced black pixel, and this disclosure is generally directed to printing non-black color with black at selected black pixel locations. In other words, this disclosure contemplates selectively adding non-black color to requested black only pixels.

Figure 3:
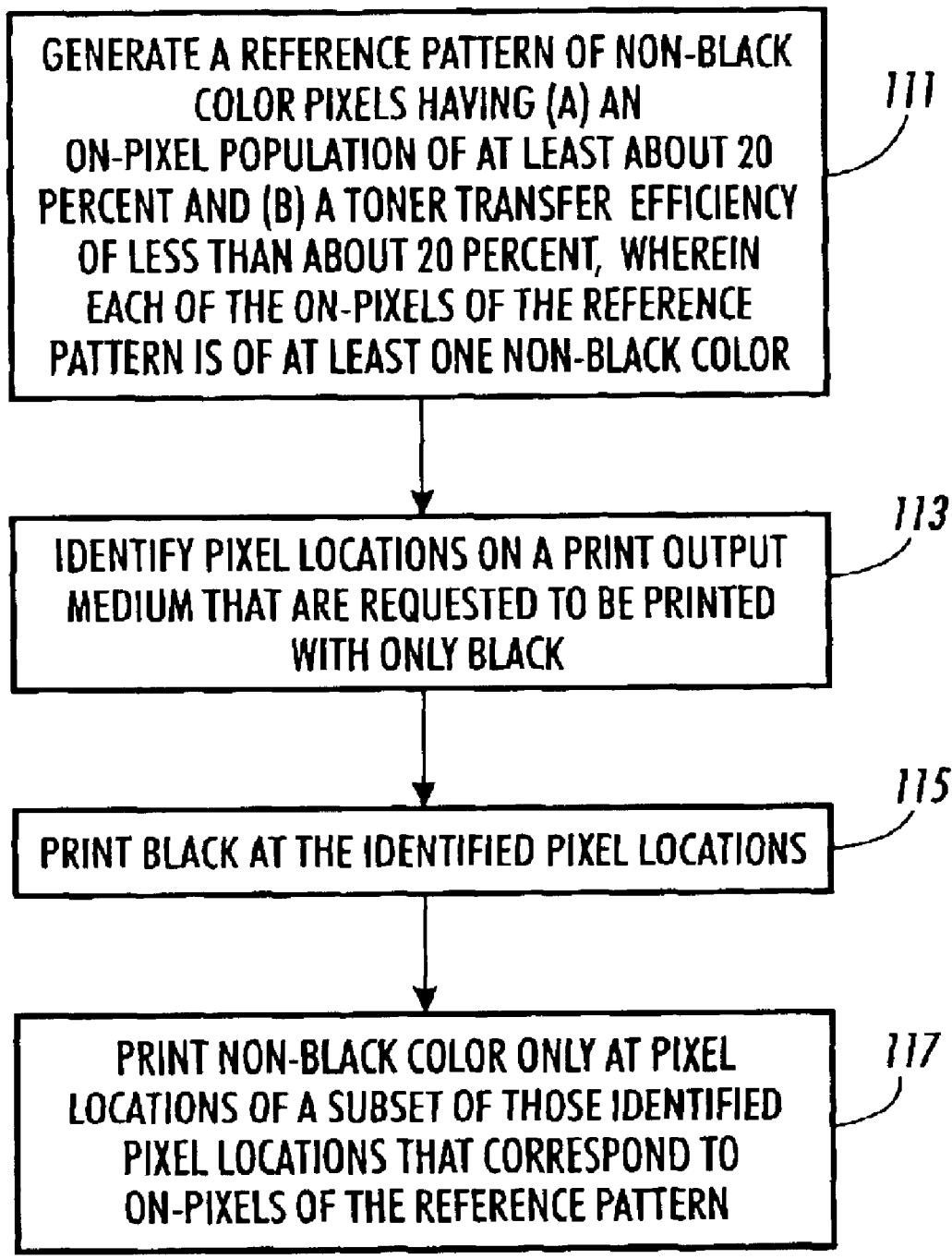
FIG. 3 is a flow diagram of an embodiment of a procedure for selectively printing color enhanced black pixels.

FIG. 3 is a flow diagram of an embodiment of a procedure for selectively printing enhanced black pixels wherein non-black color is printed with black at selected black pixel locations.

At 111 a reference pattern of non-black color pixels having (a) a predetermined on-pixel population of at least about 20 percent and (b) a toner transfer efficiency of less than about 20 percent is generated, wherein each of the on-pixels of the reference pattern is of at least one non-black color. Alternatively, the reference pattern of non-black color pixels can have a toner transfer efficiency of less than about 10 percent. Toner transfer efficiency TE can be defined as follows:

$$TE=(T2/T1)\times100(\%)$$

wherein T1 is an amount of toner held in a solid state on a photosensitive drum or belt, and T2 is an amount of toner transferred from the drum or belt to a print output medium.

The reference pattern can further have a toner transfer efficiency that is greater when printed with black than when printed without black.

At 113 pixel locations on a print output medium that are requested to be printed with only black (i.e., black pixel locations) are selected or identified.

At 115 black is printed at the identified pixel locations.

At 117 non-black color is printed only at pixel locations of a subset (i.e., some or all) of those identified pixel locations that correspond to on-pixels of the reference pattern. Each black pixel location that is to be printed with a non-black color is printed with at least one non-black color, for example the non-black color(s) of the corresponding on-pixel of the reference pattern. That is, the reference pattern can define the non-black color(s) for an identified pixel location that is to be printed with at least one non-black color.

In this manner, black and non-black color are printed only at a subset of the identified pixel locations that correspond to on-pixels of a reference pattern of non-black color pixels, such that only black is printed at the identified pixel locations that do not correspond to on-pixels of the reference pattern.

The reference pattern can comprise exclusively single color non-black pixels, wherein each on-pixel is of at most a single color. Also, the reference pattern can comprise completely or partially multi-color non-black pixels.

The reference pattern of non-black color pixels can comprise a pattern of substantially dispersed or diffuse non-black color pixels which can be derived, for example, from a dispersed dot half-tone screen. By way of illustrative example, a dispersed dot half-tone screen can be generated pursuant to recursive tessellation.

The reference pattern can also comprise a pattern of substantially homogeneously distributed non-black color pixels.

Further, the reference pattern can comprise a pattern of substantially isolated non-black color pixels.

The reference pattern can also be derived from a stochastic half-tone screen.

The reference pattern of non-black color pixels can comprise a plurality of single color non-black color sub-patterns, for example one each for the primary colors such as cyan, magenta and yellow. The sub-patterns can be aligned, partially co-incident, or mutually exclusive. Each of the sub-patterns can have substantially the same on-pixel population, for example.

Each of the sub-patterns can comprise for example substantially dispersed or diffuse non-black color pixels of a particular color. In other words, within each sub-pattern, the non-black color pixels are substantially dispersed or diffuse. Also, each sub-pattern can comprise substantially isolated pixels of a particular color.

The sub-patterns can be derived from a dispersed dot half-tone screen, or a stochastic half-tone screen, for example.

By way of illustrative example, mutually exclusive single color non-black sub-patterns can be derived from non-overlapping portions of a bi-level half-tone threshold array. For example, the pixels that correspond to a lower portion of the threshold array can be assigned to a first color (e.g., magenta), the pixels that correspond to a middle portion of the threshold array can be assigned to a second color (e.g., cyan), and the pixels that correspond to an upper portion of the threshold array can be assigned to a third color (e.g., yellow).

The reference pattern can have an on-pixel population of no more than about 60 percent. As another example, the reference pattern can comprise three mutually exclusive single color non-black color sub-patterns each having an on-pixel population of no more than about 20 percent.

The invention has been described with reference to disclosed embodiments, and it will be appreciated that variations and modifications can be affected within the spirit and scope of the invention.

What is claimed is:

1. A method of printing comprising:
   identifying pixel locations on a print output medium that are requested to be marked with only black;
   electrophotographically printing black at the identified pixel locations;
   electrophotographically printing at least one non-black color only at each of pixel locations of a subset of those identified pixel locations that correspond to on-pixels of a reference pattern of non-black color pixels having an on-pixel population of at least 20 percent and a toner transfer efficiency of less than about 20 percent, wherein each non-black color pixel of the reference pattern is of at least one non-black color, and wherein the at least one non-black color for a pixel location is defined by the at least one non-black color of a corresponding non-black color pixel of the reference pattern;
   whereby black is printed by itself without a non-black color at identified pixel locations other than the subset of the identified pixel locations that correspond to on-pixels of the reference pattern of non-black color pixels.

2. The method of claim 1 wherein the reference pattern comprises a reference pattern of non-black color pixels having an on-pixel population in the range of about 20 percent to about 60 percent and a toner transfer efficiency of less than about 20 percent.

3. The method of claim 1 wherein the reference pattern comprises a reference pattern of non-black color pixels having an on-pixel population in the range of about 20 percent to about 60 percent and a toner transfer efficiency of less than about 10 percent.

4. The method of claim 1 wherein the reference pattern is derived from a stochastic half-tone screen.

5. The method of claim 1 wherein the reference pattern is derived from a dispersed dot half-tone screen.

6. The method of claim 1 wherein the reference pattern of non-black color pixels comprises a pattern of substantially homogeneously distributed non-black color pixels.

7. The method of claim 1 wherein the reference pattern of non-black color pixels comprises a pattern of substantially isolated non-black color pixels.

8. The method of claim 1 wherein each of the non-black color pixels of the reference pattern of non-black color pixels is of at least one color selected from the group consisting of cyan, magenta and yellow.

9. The method of claim 1 wherein each of the on-pixels of the reference pattern of non-black color pixels is of at most one non-black color.

10. The method of claim 1 wherein the reference pattern of non-black color pixels comprises a plurality of mutually exclusive single color non-black color pixel sub-patterns.

11. The method of claim 1 wherein the reference pattern of non-black color pixels comprises three mutually exclusive single color pixel sub-patterns, one each for cyan, magenta and yellow.

12. The method of claim 1 wherein the reference pattern of non-black color pixels comprises a plurality of mutually exclusive single color pixel sub-patterns derived from a stochastic half-tone screen.

13. The method of claim 1 wherein the reference pattern of non-black color pixels comprises a plurality of mutually exclusive single color pixel patterns derived from a dispersed dot half-tone screen.

14. The method of claim 1 wherein the reference pattern of non-black color pixels comprises three mutually exclusive single color pixel patterns derived from a stochastic half-tone screen, one each for cyan, magenta and yellow.

15. The method of claim 1 wherein the reference pattern of non-black color pixels comprises three mutually exclusive single color pixel patterns derived from a dispersed dot half-tone screen, one each for cyan, magenta and yellow.

16. The method of claim 1 wherein the reference pattern of non-black color pixels comprises a plurality of single non-black color sub-patterns.

17. The method of claim 1 wherein the reference pattern of non-black color pixels comprises a plurality of single non-black color sub-patterns derived from a stochastic half-tone screen.

18. The method of claim 1 wherein the reference pattern of non-black color pixels comprises a plurality of single non-black color sub-patterns derived from a dispersed dot half-tone screen.

19. A method of printing comprising:
   identifying pixel locations on a print output medium that are requested to be marked with only black;
   printing black at the identified pixel locations;
   after printing black, printing a non-black color only at a subset of those identified pixel locations that correspond to on-pixels of a reference pattern of non-black color pixels having an on-pixel population of at least 20 percent and a toner transfer efficiency of less than about 20 percent, wherein each non-black color pixel of the reference pattern is of at least one non-black color, and wherein the at least one non-black color for a pixel location is defined by the at least one non-black color of a corresponding non-black color pixel of the reference pattern;

whereby black is printed by itself without a non-black color at identified pixel locations other than the subset of the identified pixel locations that correspond to on-pixels of the reference pattern of non-black color pixels.

20. The method of claim 19 wherein the reference pattern comprises a reference pattern of non-black color pixels having an on-pixel population in the range of about 20 percent to about 60 percent and a toner transfer efficiency of less than about 20 percent.

21. The method of claim 19 wherein the reference pattern comprises a reference pattern of non-black color pixels having an on-pixel population in the range of about 20 percent to about 60 percent and a toner transfer efficiency of less than about 10 percent.

22. The method of claim 19 wherein the reference pattern is derived from a stochastic half-tone screen.

23. The method of claim 19 wherein the reference pattern is derived from a dispersed dot half-tone screen.

24. The method of claim 19 wherein the reference pattern of non-black color pixels comprises a pattern of substantially homogeneously distributed non-black color pixels.

25. The method of claim 19 wherein the reference pattern of non-black color pixels comprises a pattern of substantially isolated non-black color pixels.

26. The method of claim 19 wherein each of the non-black color pixels of the reference pattern of non-black color pixels is of at least one color selected from the group consisting of cyan, magenta and yellow.

27. The method of claim 19 wherein each of the on-pixels of the reference pattern of non-black color pixels is of at most one non-black color.

28. The method of claim 19 wherein the reference pattern of non-black color pixels comprises a plurality of mutually exclusive single color non-black color pixel sub-patterns.

29. The method of claim 19 wherein the reference pattern of non-black color pixels comprises three mutually exclusive single color pixel sub-patterns, one each for cyan, magenta and yellow.

30. The method of claim 19 wherein the reference pattern of non-black color pixels comprises a plurality of mutually exclusive single color pixel sub-patterns derived from a stochastic half-tone screen.

31. The method of claim 19 wherein the reference pattern of non-black color pixels comprises a plurality of mutually exclusive single color pixel patterns derived from a dispersed dot half-tone screen.

32. The method of claim 19 wherein the reference pattern of non-black color pixels comprises three mutually exclusive single color pixel patterns derived from a stochastic half-tone screen, one each for cyan, magenta and yellow.

33. The method of claim 19 wherein the reference pattern of non-black color pixels comprises three mutually exclusive single color pixel patterns derived from a dispersed dot half-tone screen, one each for cyan, magenta and yellow.

34. The method of claim 19 wherein the reference pattern of non-black color pixels comprises a plurality of single non-black color sub-patterns.

35. The method of claim 19 wherein the reference pattern of non-black color pixels comprises a plurality of single non-black color sub-patterns derived from a stochastic half-tone screen.

36. The method of claim 19 wherein the reference pattern of non-black color pixels comprises a plurality of single non-black color sub patterns derived from a dispersed dot half-tone screen.

37. A method of printing comprising:

identifying pixel locations on a print output medium that are requested to be marked with only black;

electrophotographically printing black at the identified pixel locations;

electrophotographically printing a non-black color only at a subset of those identified pixel locations that correspond to on-pixels of a reference pattern of non-black color pixels having an on-pixel population of at least 20 percent and a toner transfer efficiency of less than about 20 percent, wherein the reference pattern comprises three mutually exclusive single color sub-patterns, one each for cyan, magenta and yellow, and wherein a non-black color for a pixel location is defined by a color of a corresponding non-black color pixel of the reference pattern;

whereby black is printed by itself without a non-black color at identified pixel locations other than the subset of the identified pixel locations that correspond to on-pixels of the reference pattern of non-black color pixels.

38. The method of claim 37 wherein the reference pattern comprises a reference pattern of non-black color pixels having an on-pixel population in the range of about 20 percent to about 60 percent and a toner transfer efficiency of less than about 20 percent.

39. The method of claim 37 wherein the reference pattern comprises a reference pattern of non-black color pixels having an on-pixel population in the range of about 20 percent to about 60 percent and a toner transfer efficiency of less than about 10 percent.

40. The method of claim 37 wherein the plurality of single color sub-patterns are derived from a stochastic half-tone pattern.

41. The method of claim 37 wherein the plurality of single color sub-patterns are derived from a dispersed dot half-tone pattern.

* * * * *